UNITED STATES PATENT OFFICE.

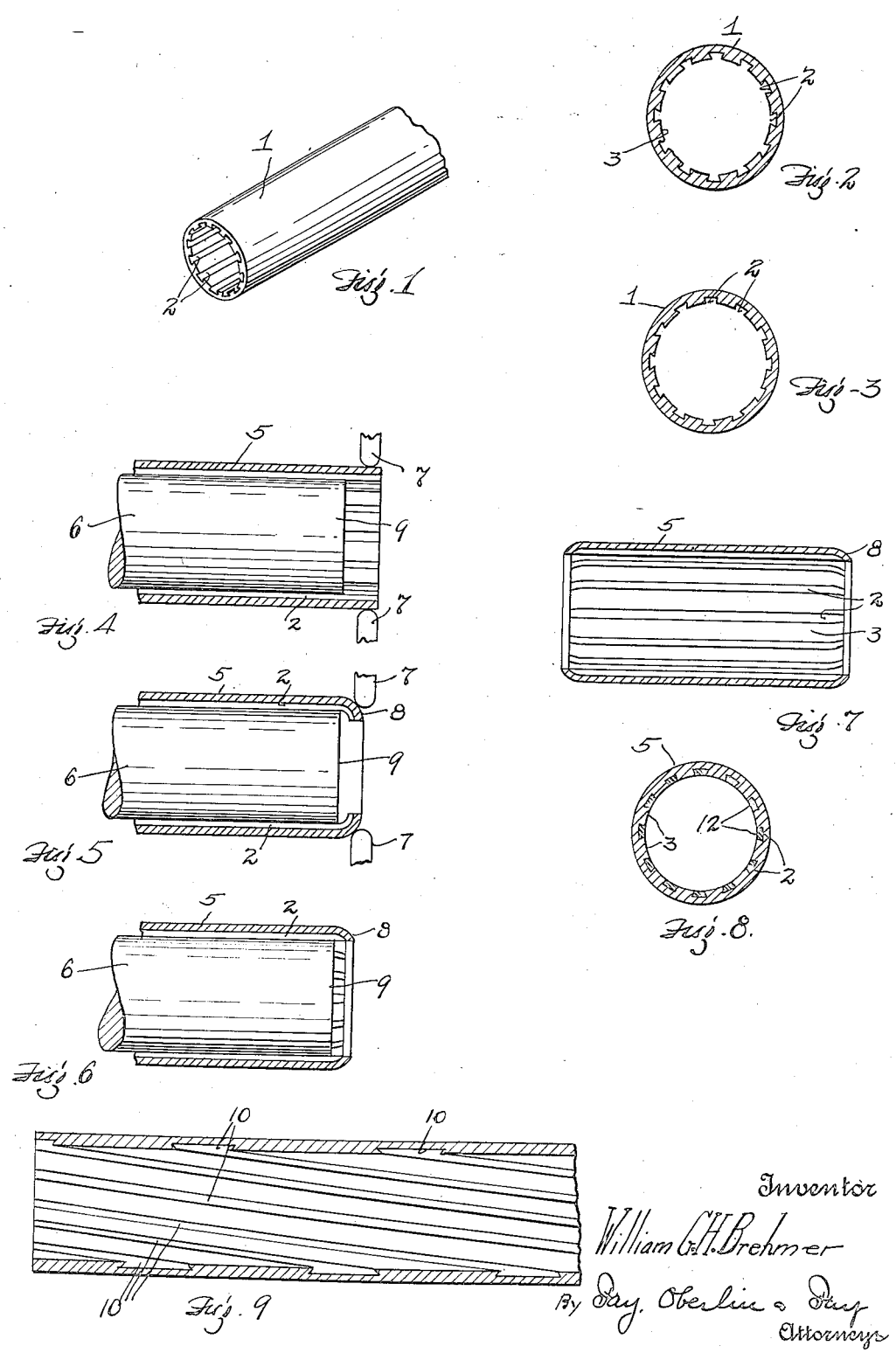

WILLIAM G. H. BREHMER, OF CLEVELAND, OHIO, ASSIGNOR TO THE CLEVELAND GRAPHITE BRONZE COMPANY, OF CLEVELAND, OHIO, A CORPORATION OF OHIO.

BEARING AND METHOD OF MAKING SAME.

1,422,655.  Specification of Letters Patent.  Patented July 11, 1922.

Application filed September 2, 1920. Serial No. 407,766.

*To all whom it may concern:*

Be it known that I, WILLIAM G. H. BREHMER, a citizen of the United States, and a resident of Cleveland, county of Cuyahoga, and State of Ohio, have invented a new and useful Improvement in Bearings and Methods of Making Same, of which the following is a specification, the principle of the invention being herein explained and the best mode in which I have contemplated applying that principle, so as to distinguish it from other inventions.

The present invention relates to an improved type of self-lubricated bearing and to a new and relatively inexpensive method of producing same.

At present bearings having lubricating inserts are made by two general methods. In one method the bearings are cast with pockets or recesses formed on the bearing surfaces, these recesses then being filled with a lubricating composition, such, for example, as a mixture of finely divided graphite and a suitable binder. This type of bearing is expensive, first, because as it is cast it must have a considerable thickness and hence a considerable weight of metal in it, and, second, because it must be machined both inside and outside as casting does not permit of the close limits which are necessary for bearings.

A second method of producing self-lubricated bearings consists in forming a large number of closely spaced indentations in a relatively thin strip of rolled material, and then filling the indentations and circling the strips to the desired size of bearing. This method is very much less expensive than the casting method and produces a very satisfactory bushing but one that has a seam or joint along one side.

My improved method is less expensive than the casting method and approximately as cheap as the indented one, while it possesses peculiar advantages of its own, which will be hereinafter described. To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

In said annexed drawing:—

Fig. 1 is a perspective view of an extruded tube at the close of the first operation; Fig. 2 is a transverse section through the same, illustrating the character of the grooves at an intermediate stage of the extrusion; Fig. 3 is a similar section through such tube when finally extruded; Fig. 4 is a longitudinal section through the tube before the end is closed; Fig. 5 is a similar view after the closing of the end; Fig. 6 is a similar view when the end has been trimmed; Fig. 7 is a similar view of the tube as completed; Fig. 8 is a transverse section showing the tube when the grooves are filled with lubricant; and Fig. 9 is a longitudinal section of a modified form of my bushing.

I first extrude a tube 1 of suitable bearing metal, such as brass or bronze, from an extruding machine under very heavy pressure. This tube is run out to considerable length and can be held to very close limits of inside and outside size. During extrusion of the tube, grooves 2 can be formed in the inner walls by the use of suitable dies in the extruding machine, the dies being constructed to provide a series of equidistantly spaced longitudinally extending grooves running the entire length of the tube, and of the shape shown in Fig. 2. The grooves are preferably rectangular in cross section as indicated, and take up about 30 per cent of the area of the interior wall of the tube, thus leaving about 70 per cent of the area of the tube wall as a bearing surface for the shaft to be journaled. The dies may be so constructed as to produce first a slightly undercut groove as shown in Fig. 2 with but slightly overhanging edges which during the remainder of the operation can be formed as in Fig. 3 with very clearly defined undercut walls.

After the tube has been thus formed it is cut into short lengths of the desired dimensions for the finished bearings and is then subjected to a broaching operation. This broaching operation serves to smooth and polish the interior surface of the tube, that is, the lands 3 lying between the grooves 2, and in this way giving the interior wall of the tube an extremely smooth polished surface.

At the same time the grooves may be trimmed slightly at their edges if necessary. The broaching operation acts to compress the metal of the interior walls of the tube and to flow this metal. As the metal is already in an extremely dense and homogeneous condition, due to the great pressure exerted upon it during the extrusion operation, it is left after the broaching operation in an extremely desirable condition for a bearing. Furthermore, the broaching serves to cause the metal at the edges of the grooves to still further overhang the grooves, and thus decrease the width of the groove while maintaining the depth unchanged.

The bushings 5 in the desired lengths are then subjected to an end closing operation, which turns in the end a radial distance equal to the depth of the grooves 2. This may be accomplished by slipping bushing over a mandrel 6 and positioning the mandrel a short distance from the end of the bushing. This extending end is then turned inwardly over the end 9 of the mandrel by means of rolls 7 which, while revolving, are pressed toward each other as shown in Fig. 5. The end 8 of the bushing is next drilled out to the same diameter as the interior of the remainder of the bushing, giving a bushing of the construction shown in Fig. 7.

The bushing is then filled with a lubricant, that is, the grooves 2 are filled with a suitable mixture 12 of graphite and a binder and are ready for use.

In Fig. 9 I have shown a tube similar to that shown in Figs. 1 to 8, except that the tube has been continuously twisted as it is pressed from the extruding die in order to give a helical form to the longitudinally extending grooves 10, and in this tube these grooves 10 extend helically around the interior of the tube, as indicated in the figure referred to. The succeeding operations on this tube are the same as on the tube previously described. The present bushing is seamless, of very dense hard metal because of the working and can be produced economically.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making bushings, the steps which consist in extruding a cylindrical tube provided with a series of longitudinally extending grooves, and then filling such grooves with a lubricant.

2. In a method of making bushings, the steps which consist in extruding a cylindrical tube of a suitable bearing metal provided with a series of equidistantly spaced longitudinally extending grooves, and then filling such grooves with a solid lubricant.

3. In a method of making bushings, the steps which consist in extruding a cylindrical tube of a suitable bearing metal provided with a series of equidistantly spaced longitudinally extending helical grooves, cutting such tube into bushings of the desired lengths, and then filling such grooves with a solid lubricant.

4. In a method of making bushings, the steps which consist in extruding a cylindrical tube of a suitable bearing metal provided with a series of longitudinally extending grooves and then broaching such tube to burnish the interior wall thereof.

5. A bearing comprising an extruded seamless tubular member provided with a series of longitudinally extending grooves in its interior wall such grooves stopping short of the ends of said member and said member having a dense highly burnished interior wall.

6. A bearing comprising an extruded seamless tubular member provided with a series of longitudinally extending grooves in its interior wall filled with a solid lubricant such grooves stopping short of the ends of said member and said member having a dense highly burnished interior wall.

7. In a method of making a bushing, the steps which consist in extruding a cylindrical tube, of a suitable bearing metal provided with a series of longitudinally extending grooves in its interior wall, and then closing the ends of such grooves in said tube.

8. In a method of making a bushing, the steps which consist in extruding a cylindrical tube, of a suitable bearing metal provided with a series of longitudinally extending grooves in its interior wall, and then pressing the ends of said tube inwardly a distance at least equal to the depth of such grooves, thereby closing the ends of said grooves.

9. In a method of making a bushing, the steps which consist in extruding a cylindrical tube, of a suitable bearing metal provided with a series of longitudinally extending grooves in its interior wall, and then pressing the ends of said tube inwardly, a distance greater than the depth of such grooves, and then drilling out the closed in end of such bushing to the diameter of the bushing intermediate its ends.

Signed by me, this 20th day of August, 1920.

WILLIAM G. H. BREHMER.